US009862129B2

(12) United States Patent
Strahm et al.

(10) Patent No.: US 9,862,129 B2
(45) Date of Patent: Jan. 9, 2018

(54) METHOD FOR MAKING AN OSCILLATING WEIGHT MADE FROM COMPOSITE MATERIALS

(71) Applicant: ETA SA Manufacture Horlogere Suisse, Grenchen (CH)

(72) Inventors: Florent Strahm, Sonceboz-Sombeval (CH); Laurent Kaelin, Sonvilier (CH); Xavier Tinguely, Fontaines (CH); Giuseppe Cappadona, Bienne (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 276 days.

(21) Appl. No.: 14/763,687

(22) PCT Filed: Mar. 25, 2014

(86) PCT No.: PCT/EP2014/055984
§ 371 (c)(1),
(2) Date: Jul. 27, 2015

(87) PCT Pub. No.: WO2014/154705
PCT Pub. Date: Oct. 2, 2014

(65) Prior Publication Data
US 2016/0059452 A1 Mar. 3, 2016

(30) Foreign Application Priority Data

Mar. 28, 2013 (EP) .................................... 13161768
Apr. 15, 2013 (EP) .................................... 13163777

(51) Int. Cl.
*B29C 45/14* (2006.01)
*B29C 45/00* (2006.01)
(Continued)

(52) U.S. Cl.
CPC ...... *B29C 45/0003* (2013.01); *B29C 37/0082* (2013.01); *B29C 45/14344* (2013.01);
(Continued)

(58) Field of Classification Search
None
See application file for complete search history.

(56) References Cited

U.S. PATENT DOCUMENTS 2,894,367 A * 7/1959 Gingrich .................. G04C 3/06
310/27
2,968,840 A * 1/1961 Morse .................... F16B 33/006
220/288

(Continued)

FOREIGN PATENT DOCUMENTS

CH         288208        1/1953
CH         705733    *   5/2013
(Continued)

OTHER PUBLICATIONS

International Search Report dated Oct. 7, 2014 in PCT/EP2014/055984 Filed Mar. 25, 2014.

*Primary Examiner* — Edmund Lee
(74) *Attorney, Agent, or Firm* — Oblon, McClelland, Maier & Neustadt, L.L.P.

(57) ABSTRACT

A method for making an oscillating weight for an automatic winding mechanism of a self-winding watch including a central part made from a first composite material and a heavy sector made from a second composite material charged with heavy metal particles, the method including: forming the central part with a lateral rib and a rebate by injecting the first composite material into a mold; overmolding the heavy sector onto the central part by injecting the second composite material into a mold containing the central part, so that the second composite material fills the rebate and a gap underneath the lateral rib, so that the lateral rib is (Continued)

embedded in the second composite material and the central part and the heavy sector are interlocked.

7 Claims, 5 Drawing Sheets

(51) Int. Cl.
  B29C 37/00 (2006.01)
  G04B 5/16 (2006.01)
  B29C 45/16 (2006.01)
  B29L 9/00 (2006.01)

(52) U.S. Cl.
  CPC ...... B29C 45/1615 (2013.01); B29C 45/1657 (2013.01); G04B 5/165 (2013.01); *B29C 2045/14327* (2013.01); *B29C 2045/14368* (2013.01); *B29C 2045/1696* (2013.01); *B29L 2009/00* (2013.01)

(56) References Cited

U.S. PATENT DOCUMENTS

| | | | | |
|---|---|---|---|---|
| 3,398,222 A * | 8/1968 | Kaufman, Jr. | .... | B29C 45/14344 264/250 |
| 3,894,776 A * | 7/1975 | Black | ........ | B60B 5/02 301/5.307 |
| 3,942,317 A * | 3/1976 | Schluep | .......... | G04B 5/16 106/404 |
| 4,057,885 A * | 11/1977 | Giger | ............ | G04B 5/16 29/509 |
| 4,241,620 A * | 12/1980 | Pichl | ............ | F02B 77/14 310/156.23 |
| 5,160,474 A * | 11/1992 | Huff | ............ | B29C 37/0082 165/173 |
| 6,548,001 B1 * | 4/2003 | Lichtinger | ............ | B29C 45/16 264/161 |
| 9,004,749 B2 * | 4/2015 | Poffet | ............ | G04B 5/165 29/896.3 |
| 2006/0043639 A1 * | 3/2006 | Tseng | ............ | B29C 45/14 264/246 |
| 2010/0054089 A1 * | 3/2010 | Maier | ............ | B81C 99/0085 368/169 |
| 2012/0155229 A1 * | 6/2012 | Araki | ............ | G04B 5/165 368/285 |
| 2012/0195173 A1 * | 8/2012 | Poffet | ............ | G04B 5/165 368/208 |
| 2013/0114381 A1 * | 5/2013 | Kaelin | ............ | G04B 5/165 368/208 |
| 2014/0328149 A1 * | 11/2014 | Villar | ............ | G04B 13/02 368/124 |

FOREIGN PATENT DOCUMENTS

| | | | |
|---|---|---|---|
| DE | 1 944 849 | | 4/1970 |
| DE | 1944849 | * | 2/1978 |
| EP | 2 482 142 | | 8/2012 |
| EP | 2 592 498 | | 5/2013 |

* cited by examiner

METHOD FOR MAKING AN OSCILLATING WEIGHT MADE FROM COMPOSITE MATERIALS

CROSS-REFERENCE TO RELATED APPLICATIONS

This is a National Phase Application in the United States of International Patent Application PCT/EP 2014/055984 filed Mar. 25, 2014, which claims priority on European Patent Applications No. 13161768.0 of Mar. 28, 2013 and Ser. No. 13/163,777.9 of Apr. 15, 2013 The entire disclosures of the above patent applications are hereby incorporated by reference.

FIELD OF THE INVENTION

The present invention relates to method for making an oscillating weight made from composite material for automatic winding mechanism of a self-winding watch, the oscillating weight having a central part made from a first composite material and a heavy sector made from a second composite material charged with heavy metal particles.

PRIOR ART

Oscillating weights for self-winding watches made from composite material are known. Patent document EP 2 482 142 describes an oscillating weight formed by molding polyamide charged with glass fibers and tungsten particles. The composite material has a density higher than 8 and the glass fibers that it contains represent between 1.5% and 7% of the total mass. The possibility of forming this oscillating weight by molding has the advantage of enabling diverse, sometimes very complicated, shapes to be obtained without any reworking operation.

In an oscillating weight the central part that forms the link between the heavy sector and the pivot pin must be sufficiently flexible and elastic to absorb impacts. If this is not the case, there is a risk of the suspension of the weight or the central part thereof breaking. Furthermore, the addition of heavy metal particles to a plastic material tends to make the latter brittle. Tests conducted by the applicant have shown that even when a reinforcement in the form of fibers has been added to the charged plastic material, the oscillating weights produced could be too fragile for certain applications. A solution to this problem would be to produce the heavy sector and the central part of the oscillating weight from two different composite materials. For example, injection of a composite material charged with heavy metal particles may be used to firstly form the heavy sector. Then, a composite material without any heavy metal particles can be injected to form the central part of the bi-material oscillating weight by overmolding thereon.

A first problem with the solution that has just been described is that, during injection to form the central part of the oscillating weight, the heavy metal tends to diffuse from the heavy sector to the central part by altering the color of the composite material and by producing some unsightly spots. A second problem with the solution that has just been described is that the adhesion of the composite material without heavy metal to the composite material with heavy metal is not very good. Moreover, a person skilled in the art will have no difficulty in understanding that, in the context of horology, the above problem is all the more difficult as the formed parts are extremely small. It can be noted in this regard that the thickness of a bi-material oscillating weight at the location where the central part and the heavy sector join should normally be less than 2 millimeters (even less than 1 millimeter in certain cases). It follows from this that the extent of the contact area between composite materials with and without heavy metal is necessarily very limited. Thus, even if there is no longer a risk of breakage of the central part of the bi-material oscillating weights formed using this molding technique, the proposed solution merely shifts the problem. In fact, it is now the heavy sector that is at risk of detaching from the central part in the case of impact.

BRIEF OUTLINE OF THE INVENTION

An aim of the present invention is to remedy the aforementioned problem by providing a method for making a bi-material oscillating weight, in which the appearance of the joint between the central part and the heavy sector is clean and free of burrs, and in which this joint is not at risk of breaking. The present invention achieves this aim by providing a method for making n oscillating weight for automatic winding mechanism of a self-winding watch according to the appended claim 1.

It is noted that the term "heavy metal" here denotes any metal with a density higher than 11 and preferably higher than 17. Moreover, the term "composite material" here generally denotes a material formed from a matrix of plastic material and a reinforcement (preferably in the form of fibers) that assures mechanical strength.

It is also noted that the terms "upper edge of the central part", "above the lateral rib" or "below the lateral rib" should be understood in relation to the orientation on the sheet of sectional views of FIGS. 2B, 2C, 3B, 4B, 5B and 5C. It will additionally be understood that in the usual situation where the oscillating weight is mounted between the movement and the base of the watch case, the top of the oscillating weight corresponds to the base side, while the bottom of the oscillating weight corresponds to the movement side.

According to the invention the central part of the oscillating weight is first molded. The molded central part has a lateral rib. In addition, a rebate is formed in the upper edge of the central part above the lateral rib. The lateral rib is therefore appreciably thinner than the central part. Therefore, there is a risk of deformation of the lateral rib. This is why, according to the invention, sections without undercut are arranged along the peripheral edge to alternate with the first sections to make the rib rigid. According to the invention, the heavy sector is then overmolded onto the central part, in such a way that the lateral rib is embedded in the second composite material and that the central part and the heavy sector are interlocked. Lastly it will be understood that, as the heavy sector is formed after the central part, the heavy metal particles which are contained in the second composite material are not at risk of contaminating the first composite material.

BRIEF DESCRIPTION OF THE FIGURES

Other features and advantages of the present invention will become evident upon reading the following description given solely by way of non-restrictive example with reference to the attached drawings.

DETAILED DESCRIPTION OF DIFFERENT EMBODIMENTS

Figure 1A:
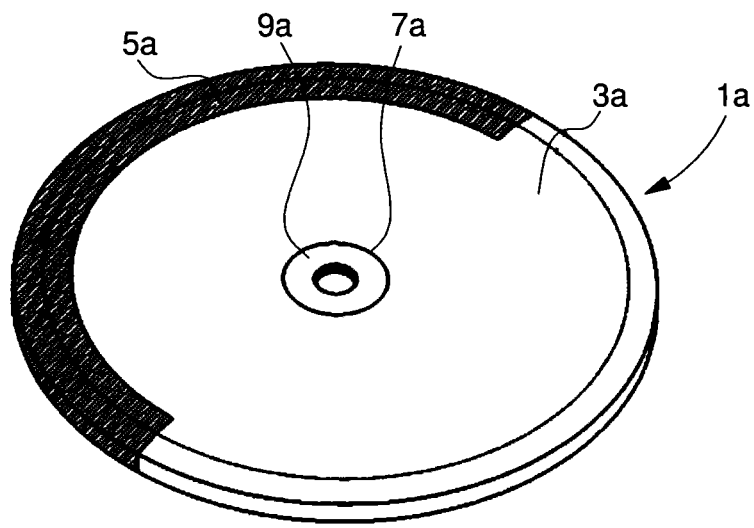
FIG. 1A is a perspective view of the top of a first embodiment of an oscillating weight made by a method according to the invention.

FIG. 1A is a perspective view of a first embodiment of an oscillating weight made by a method according to the invention. This "bi-material" oscillating weight 1a classically has a central part or support 3a and a half-ring-shaped heavy sector 5a. According to the invention, the central part 3a is made from a first composite material, while the heavy sector 5a is made from a second composite material charged with heavy metal particles. In the embodiment illustrated in FIG. 1A, the second composite material is charged with tungsten particles in a sufficient quantity to give it a density higher than 8 and preferably even higher than 10.

The function of the central part or support 3a of the oscillating weight is to join the heavy sector 5a to a pivot pin (not shown). For this purpose, the central part made from composite material has a central opening 7a, in which means for fastening to the pivot pin are arranged. These fastening means only concern the invention indirectly and will not be described in detail. Suffice it to say that in the present embodiment the fastening means comprise a ring (given the reference 9a in FIG. 1A), which forms the hub of the oscillating weight. In the present embodiment the central part is formed in a single step of molding to the metal ring 9a. More precisely, the central part 3a is overmolded onto the ring. However, it will be understood that according to a variant this ring could be fastened in the central part by gluing, riveting or any other method available to the person skilled in the art.

According to the embodiment of FIG. 1A, the central part 3a has the general form of a solid disc. As for the heavy sector 5a, it has the form of a sector of an annulus that extends over about 180°. As will be seen in more detail below, the heavy sector 5a made from composite material charged with tungsten particles is overmolded onto the support 3a made from non-charged composite material. The fact that the central part is made from a non-charged composite material enables this part to be given much greater flexibility and much greater elasticity, and then to improve the impact resistance of the oscillating weight.

Figure 1B:
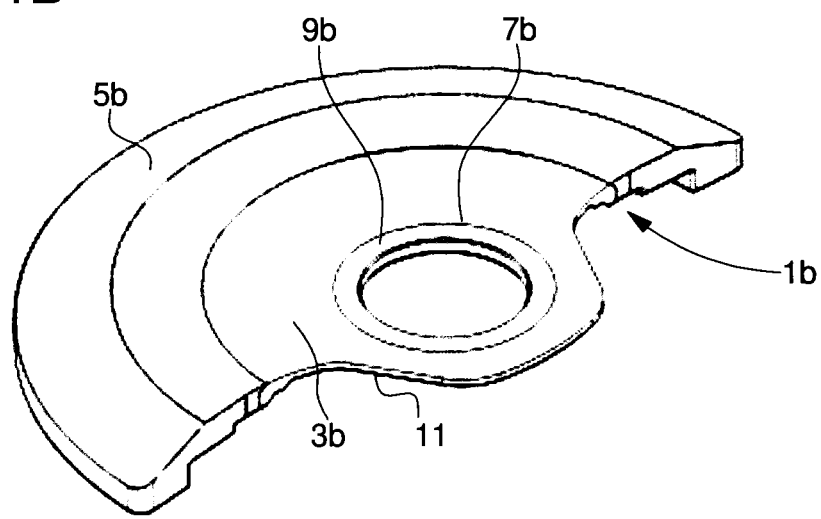
FIG. 1B is a perspective view of the top of a second embodiment of an oscillating weight made by a method according to the invention.

FIG. 1B is a perspective view of a second variant of a bi-material oscillating weight made by a process according to the invention. In this figure identical or functionally equivalent elements to those shown in FIG. 1A are given the same reference numbers. In contrast to the first variant, as may be seen in FIG. 1B, the central part or support 3b has a wide slot 11 on one side that gives the support a general shape that is closer to a half disc than a disc. As is well known to a person skilled in the art, the general shape of the oscillating weight of FIG. 1B is a completely standard shape.

It can also be seen in FIG. 1B that the support 3b has an opening 7b arranged to receive a ring 9b that forms part of the means for fastening the oscillating weight 1b to its pivot pin (not shown). As in the case of the first variant, the central part 3b is firstly overmolded onto the metal ring 9b and the heavy sector 5b is then made by overmolding a composite material charged with tungsten particles onto the support 3b. As may be seen, the heavy sector 5b has the shape of a sector of an annulus, which extends over a little less than 180°.

As has already been stated, the central parts 3a and 3b are made from a non-charged composite material. "Composite material" is understood to mean a material comprising a matrix of plastic material, on the one hand, and a reinforcement (preferably in the form of fibers) assuring the mechanical strength, on the other hand. The technique of injection molding is preferably employed to form the central part 3a or 3b of an oscillating weight according to the invention. The technique of injection molding parts made from composite material without the addition of heavy metal particles will not be described here, since this technique is well known to a person skilled in the art. It is simply reminded that an advantage of this technique is that injection molding enables parts of composite material with relatively complicated shapes to be formed in a single shaping operation without requiring a reworking or finishing operation.

The following procedure can be followed to form the heavy sector 5a or 5b of an oscillating weight according to the invention. A homogeneous mixture containing the plastic material, the heavy metal particles and the reinforcement in the form of fibers is firstly prepared, wherein this mixture is in liquid state. Advantageously, it is possible to use commercially available intermediate products to prepare the mixture.

For example, tungsten can be acquired in the form of polyamide 12 granules (density 1.02) charged with tungsten powder (density 19.2). These granules are marketed by PolyOne Corporation in particular under the trademark Gravi-Tech® GRV-NJ-110-W. The mixture the granules are made from has a density of 11.0 and is suitable for injection molding. Moreover, fibers mixed with polyamide 12 are marketed, by example, by EMS-GRIVORY under the name Grilamid® TRVX-50X9 Natur. These are also granules.

They are formed to about 50% (by volume) from glass fibers, the remainder being polyamide 12.

The mixture according to the invention can be made by mixing Grilamid TR® and Gravi-Tech® granules so that the Grilamid preferably constitutes between 2.5% and 5% of the total weight of the mixture. This mixture of granules is used to feed the reservoir of an injection molding plant. It is noted that this plant can be of usual type, but must also be suitable for overmolding operations. Moreover, it will be understood that Grilamid TR® and Gravi-Tech® granules have very different densities. Thus, Grilamid TR® granules have a tendency to concentrate in the upper part of the mixture. It is therefore important to ensure that the mixture is properly homogeneous in order to guarantee good reproducibility of the molded parts.

In summary, to form an oscillating weight in accordance with the present invention the central part 3a or 3b is preferably formed first by injection molding a first composite material. The heavy sector 5a or 5b is then overmolded onto the central part by injecting a second composite material charged with heavy metal particles into a mold containing the central part.

Figure 2A:
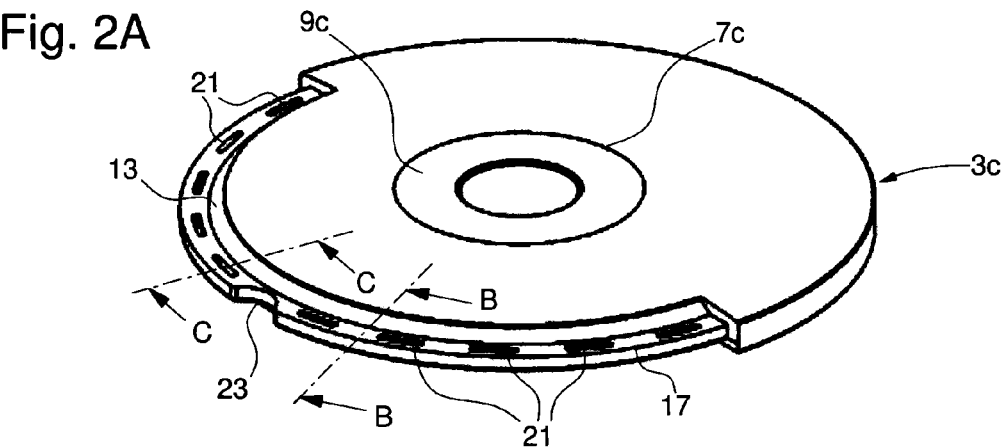
FIG. 2A is a perspective view of the top of the central part of a third embodiment of an oscillating weight made by a method according to the invention.
Figure 2B:
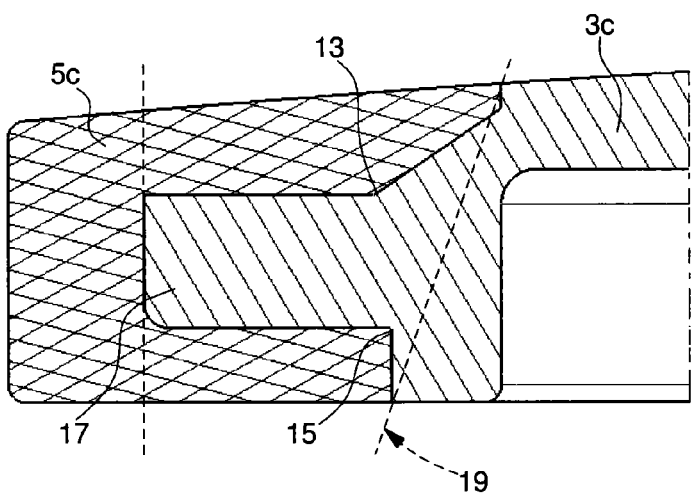
FIG. 2B is a partial cutaway view of the oscillating weight of FIG. 2A, wherein the cutting plane corresponds to the radius B-B in FIG. 2A and the partial view shows in particular the zone of interlocking of the heavy sector with the central part.

FIG. 2A is a perspective view of the central part 3c of a third embodiment of an oscillating weight made by a method according to the invention. As was already the case with the first embodiment, the central part 3c shown in FIG. 2A has the general form of a solid disc. It can be seen in the figure that a rebate 13 is formed in the upper edge of the central part 3c and that it extends approximately over 180°. As can be seen in FIGS. 2A and 2B, the central part 3c also has a second rebate 15, which extends over the same angular sector as the first rebate, but is formed at the level of the lower edge. It is also evident from the figures that the two rebates delimit a substantially circular arc-shaped lateral rib 17 between them. In the present embodiment the thickness of the central part 3c at the location where the heavy sector 5c is molded on is 1.7 mm. The thickness of the rib 17 itself is limited to 0.8 mm and the two rebates 13 and 15 then share the remaining 0.9 mm. FIG. 2B is a partial cutaway view taken along radius B-B of FIG. 2A. It shows the interlocking of the heavy sector and the central part. As can be seen in this figure, once the heavy sector 5c has been overmolded onto the central part 3c, the charged composite material forming the heavy sector fills the two rebates 13 and 15. Thus, the lateral rib 17 is completely embedded in the mass of the heavy sector. It will thus be understood that according to the invention the rebates 13 and 15 allow the central part 3c and the heavy sector 5c to interlock one another. The zone in which the central part 3c and the heavy sector 5c interlock will be referred to below by the term "interlocking zone" (given the reference 19 in FIG. 2B).

One difficulty in configuring the bi-material oscillating weights of the present invention is the fact that the polymer used does not mix well with the heavy metal particles. More specifically, during injection the molten polymer only wets the heavy metal particles slightly. Besides the fact that this phenomenon increases the viscosity of the mixture, another disadvantage is that during the overmolding process the charged composite material adheres very poorly to the non-charged composite material. This is the reason why in order to ensure that the heavy sector attaches well to the central part, the lateral rib is formed from an alternating sequence of first sections having an undercut part and second sections devoid of undercut parts. In the embodiment illustrated in FIGS. 2A, 2B and 2C the undercut parts are formed by through holes (given the collective reference 21). As can be seen in FIG. 2A, the lateral rib 17 has ten of these holes, which are elongated in form and are spaced in a circular arc shape. Therefore, the lateral rib can be subdivided into an alternating succession of sections that contain a hole and sections that do not.

Figure 2C:
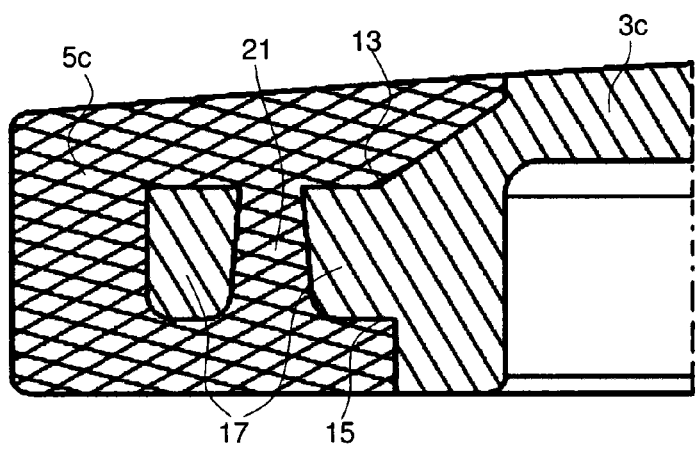
FIG. 2C is a partial cutaway view similar to that of FIG. 2B, but the cutting plane corresponds to the radius C-C in FIG. 2A.

In contrast to FIG. 2B, which is a cross-sectional view of a section without a hole, FIG. 2C is a cross-sectional view of a section with a hole (given the reference 21) (FIG. 2C being cut away along radius C-C in FIG. 2A). In the present embodiment the holes 21 are not straight, but have a width of about 0.35 mm at their upper opening and about 0.4 mm at their lower opening. It is evident from FIG. 2C that the second composite material completely fills the hole 21. It will therefore be understood that in the shown embodiment the central part 3c and the heavy sector 5c are mechanically locked onto one another and that it is impossible to separate these two parts without breaking at least one.

With its density higher than 8, the heavy sector represents a relatively significant weight. As it is mainly the lateral rib 17 that supports the heavy sector, the rib must be sufficiently rigid so as not to be irreversibly deformed under stress, in particular in the case of impact. It will be understood that it is the presence of the sections without undercut separating two consecutive holes that provides the necessary rigidity for the rib 17. In the present embodiment the 10 holes are separated by 9 sections that do not have an undercut part.

According to an advantageous variant, the lateral rib 17 has at least one groove given the reference 23 in FIG. 2A. The function of this groove is to allow the molten material to flow in on either side of the lateral rib. In fact, if during its injection the second composite material cannot be distributed equally on both sides of the rib 17, there is a risk of the rib being deformed by the resulting pressure difference.

Figure 3A:
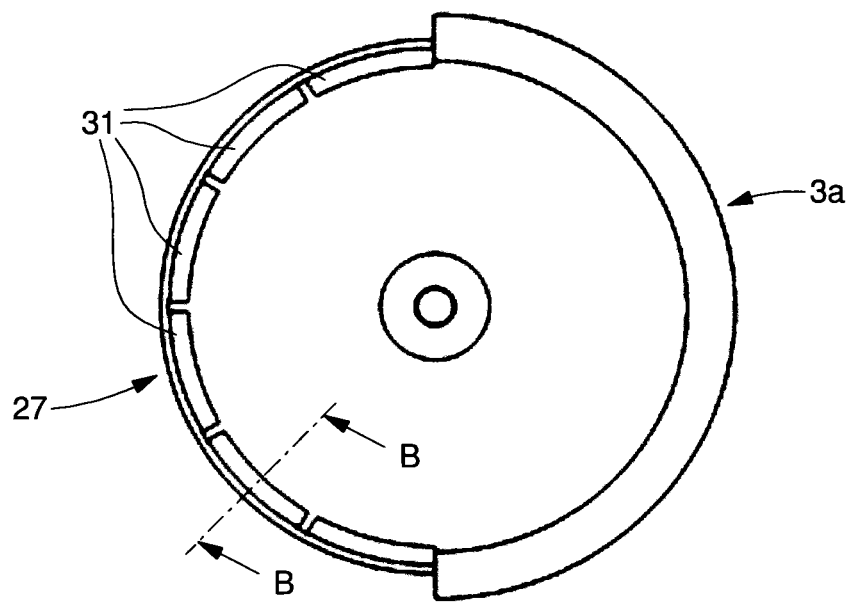
FIG. 3A is a plan view of the bottom of the central part of the oscillating weight shown in perspective in FIG. 1A.
Figure 3B:
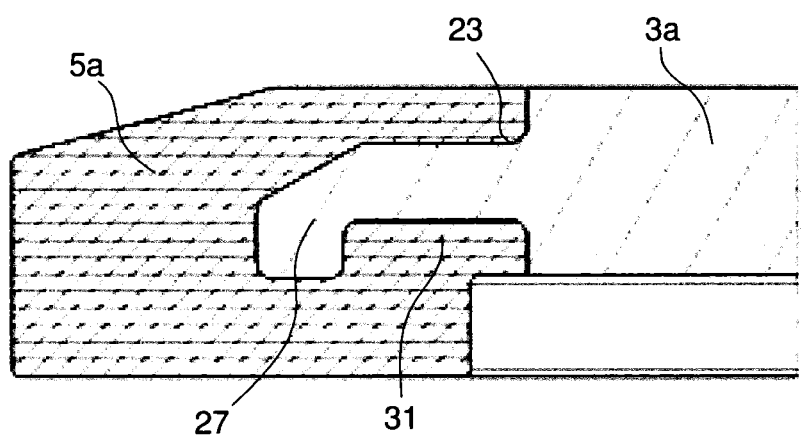
FIG. 3B is a partial cutaway view of the oscillating weight of FIGS. 1A and 3A, wherein the cutting plane corresponds to the radius B-B in FIG. 3A.

FIG. 3A is a plan view of the central part 3a of the oscillating weight shown in perspective in FIG. 1A. FIG. 3B is a partial cutaway view taken along radius B-B of FIG. 3A. It is evident from these two figures that a rebate 23 is formed in the upper edge of the central part 3a and that it extends approximately over 180°. It can also be seen from these figures that the rebate delimits a substantially circular arc-shaped lateral rib 27. FIG. 3B shows the interlocking of the heavy sector 5a with the central part. As can be seen in this figure, once the heavy sector 5a has been overmolded onto the central part 3a, the charged composite material forming the heavy sector fills the rebate 23. The charged composite material also fills the part of the mold that extends below the lateral rib. Thus, the lateral rib 27 is completely embedded in the mass of the heavy sector. It will thus be understood that according to the invention the rib 27 enables the central part 3a and the heavy sector 5a to interlock one another.

In order to assure good attachment of the heavy sector onto the central part and according to the invention, the lateral rib 27 is formed from an alternating sequence of first sections having an undercut part and second sections devoid of undercut parts. In the embodiment illustrated in FIGS. 1A, 3A and 3B the undercut parts are formed by hollows (given the collective reference 31). As can be seen in FIG. 3A, the lower face of the lateral rib 27 has six elongated hollows 31 that are spaced in a circular arc shape. It can also be seen from FIG. 3A that solid arms separate the hollows. It will be understood that in this embodiment it is the hollows 31 that form the undercut parts and the solid arms separating the hollows that form the sections without undercut part. Thus, the lateral rib 27 is formed from 6 sections having an undercut part and these sections are separated from one another by 5 sections that do not contain undercut parts. In accordance with the invention, the lateral rib can thus be subdivided into an alternating succession of sections that contain an undercut part and sections that do not.

Figure 4A:
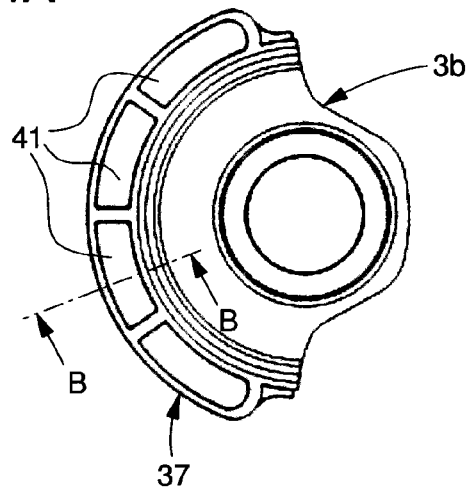
FIG. 4A is a plan view of the bottom of a first embodiment of the central part of the oscillating weight shown in perspective in FIG. 1B.
Figure 4B:
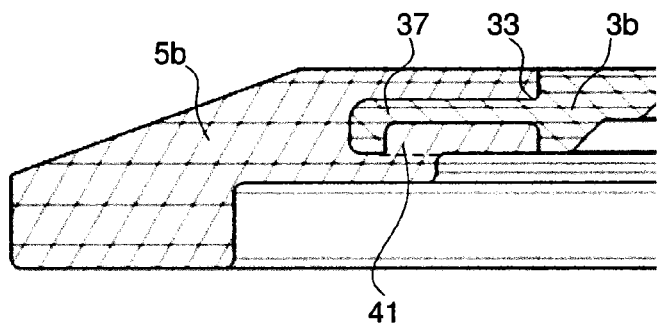
FIG. 4B is a partial cutaway view of the oscillating weight wherein the central part corresponds to FIG. 4A, the cutting plane corresponding to the radius B-B.

FIG. 4A is a plan view of a first embodiment of the central part 3b of the oscillating weight represented in the perspective view of FIG. 1B. FIG. 4B is a view in partial section taken along radius B-B of FIG. 4A. It shows the overlap of the heavy sector 5b with the central part 3b. Comparing FIGS. 4A and 4B to FIGS. 3A and 3B, it is evident that the variants shown are very similar.

To assure good attachment of the heavy sector to the central part and in accordance with the invention, the lateral rib 37 is formed from an alternating sequence of first sections having an undercut part and second sections devoid of undercut parts. In the embodiment illustrated in FIGS. 1B, 4A and 4B the undercut parts are formed by hollows (given the collective reference 41). As can be seen in FIG. 4A, the lower face of the lateral rib 37 has four hollows 41, which are elongated in form and are spaced in a circular arc shape. It can also be seen in FIG. 4A that solid arms separate these hollows. It will be understood that in this embodiment it is the hollows 41 that form the undercut parts and that the solid arms separating the hollows form the sections without an undercut part. Thus, according to the invention the lateral rib 37 can be subdivided into an alternating succession of sections that contain an undercut part and sections that do not. In the present example the number of first sections having an undercut part is 4 and the number of second sections that separate the first sections from one another is 3.

Figure 4C:
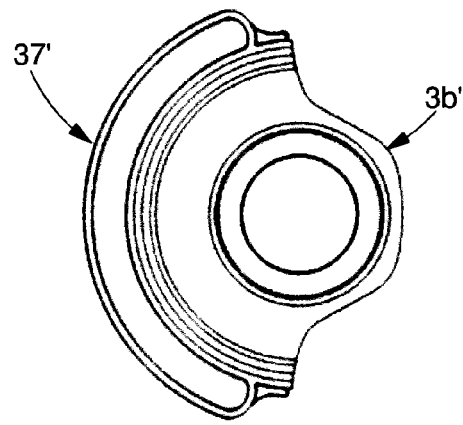
FIG. 4C is a plan view of the bottom similar to that of FIG. 4A, but showing the central part of an oscillating weight made by a method which is not in accordance with the invention.

FIG. 4C is a plan bottom view analogous to that of FIG. 4A, but showing the central part of the oscillating weight produced by a method not in accordance with the invention. In fact, as may be seen in the figure, the lower face of the lateral rib 37' only has a single hollow 41', which extends over more than 120°. There is no solid arm cutting the hollow, which thus extends from one end of the rib 37' to the other. Tests conducted by the applicant have shown that the rib 37' was not sufficiently rigid and that it was deformed during the injection compromising the stability of the heavy sector 5b. Testing thus showed that the lateral rib of the central part of an oscillating weight according to the invention should preferably have at least 3 second sections interposed between the first sections.

Figure 5A:
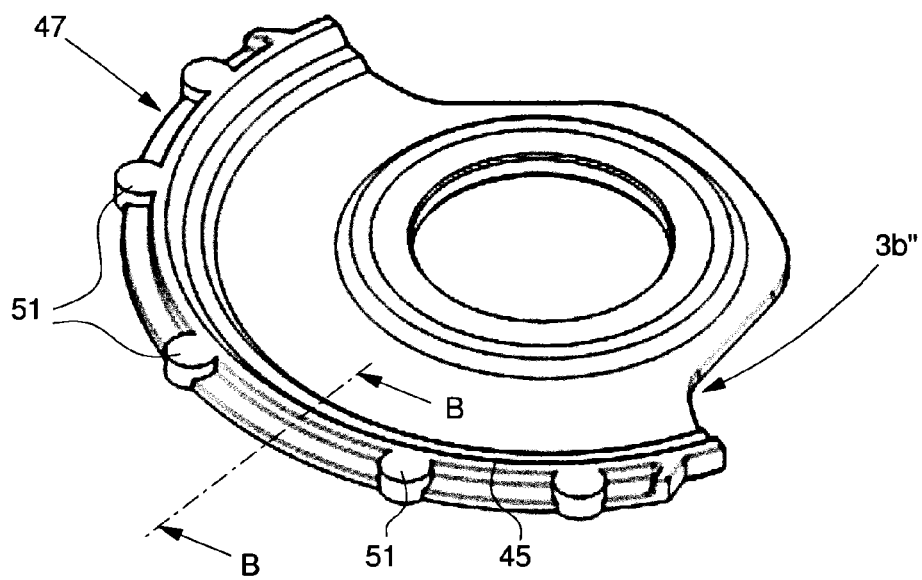
FIG. 5A is a perspective view of the bottom of a second embodiment of the central part of the oscillating weight shown in perspective in FIG. 1B.

FIG. 5A is a perspective bottom view of a second embodiment of the central part of the oscillating weight represented in the perspective view of FIG. 1B. It can be seen in the figure that in accordance with the invention, the lateral rib 47 is formed by an alternating sequence of first sections having an undercut part and second sections devoid of undercut parts. However, in the variant of the embodiment illustrated in FIGS. 5A and 5B the undercut parts are not hollows, but lateral recesses formed behind a plurality of catches (given the collective reference 51). It can be seen that the catches 51 consist of a single piece with a shoulder 45 that they back onto. It can also be seen that the catches are in the form of substantially cylindrical columns and the section of the catches thus widens as it extends away from the shoulder 45. As a result of this widening, inside corner spaces are formed between the shoulder 45 and the catches 51 on both sides of each catch. These inside corner spaces constitute as many lateral recesses with inside corners capable of being filled at least partially by the second composite material during the overmolding. It will thus be understood that the lateral recesses constitute the undercut parts in accordance with the invention.

In the present example the thickness of the central part of the oscillating weight is particularly small. In fact, the thickness of the central part 3b'' at the location where the heavy sector 5'' is overmolded is 0.83 mm. As for the thickness of the lateral rib 47, it is 0.23 mm without the catches and 0.53 mm at the locations where the rib has a catch 51. The rebate 43 formed in the upper edge of the central part has a depth of 0.3 mm.

Figure 5B:
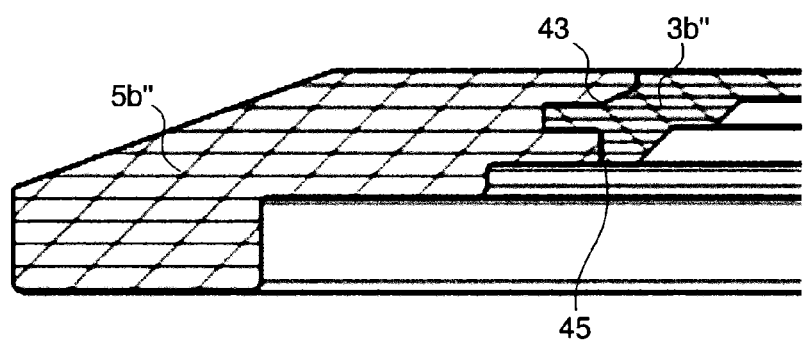
FIG. 5B is a partial cutaway view of the oscillating weight wherein the central part corresponds to FIG. 5A, the cutting plane corresponding to the radius B-B.
Figure 5C:
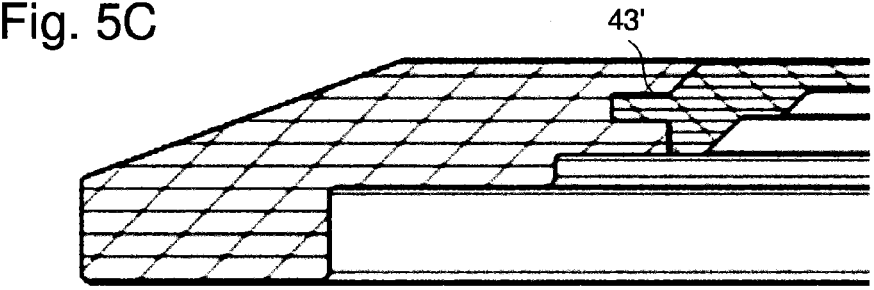
FIG. 5C is a partial cutaway view similar to that of FIG. 5B, but in which the rebate is beveled instead of being partially straight.

FIG. 5B is a view in partial section taken along B-B in FIG. 5A. It shows the overlap of the heavy sector 5b'' with the central part 3b''. It is particularly evident in this figure that the second composite material charged with heavy metal particles completely fills the rebate 43. FIG. 5C is a view in partial section similar to that of FIG. 5B, but here the rebate 43' is beveled instead of being straight. During the overmolding operation of the heavy sector onto the central part the second composite material, which is relatively viscous, does not succeed in filling the point of the bevel correctly. This difficulty creates an indistinct and unsightly separation line between the two composite materials. This problem is solved by the embodiment of FIG. 5B, in which the bevel is truncated to remove its point.

Furthermore, it will be understood that various modifications and/or improvements evident to a person skilled in that art can be applied to the embodiment forming the subject of the present description without departing from the framework of the present invention defined by the attached claims.

The invention claimed is:

1. A method for making a oscillating weight made from composite materials, the oscillating weight being provided to drive an arbor of an automatic winding mechanism of a self-winding watch, and including a central part made from a first composite material and a heavy sector made from a second composite material charged with heavy metal particles, wherein the central part and the heavy sector are joined concentrically to one another by a substantially circular arc-shaped lateral rib belonging to the central part, a rebate being formed in an upper edge of the central part above the lateral rib, the lateral rib including an alternating sequence of first sections that have an undercut part and second sections devoid of undercut parts, the method comprising:
forming the central part with the lateral rib and the rebate by injecting the first composite material into a mold;
overmolding the heavy sector onto the central part by injecting the second composite material into a mold containing the central part, so that the second composite material fills the rebate and a gap underneath the lateral rib, so that the lateral rib is embedded in the second composite material and the central part and the heavy sector are interlocked.

2. The method for making an oscillating weight according to claim 1, wherein the lateral rib has a thickness not exceeding 1 mm.

3. The method for making an oscillating weight according to claim 1, wherein the first sections of the lateral rib each have a recess, which forms the undercut part.

4. The method for making an oscillating weight according to claim 3, wherein the recess is formed by a hollow.

5. The method for making an oscillating weight according to claim 3, wherein the recess is formed by a through hole.

6. The method for making an oscillating weight according to claim 1, wherein the lateral rib comprises catches, each catch being borne by one of the first sectors of the lateral rib, and wherein the lateral rib includes a longitudinal shoulder, the undercut section of the one of the first sectors being formed by an inside corner space between the catch and the longitudinal shoulder.

7. The method for making an oscillating weight according to claim 6, wherein the catches are in a form of substantially cylindrical columns backing onto the longitudinal shoulder.

\* \* \* \* \*

UNITED STATES PATENT AND TRADEMARK OFFICE
CERTIFICATE OF CORRECTION

PATENT NO. : 9,862,129 B2
APPLICATION NO. : 14/763687
DATED : January 9, 2018
INVENTOR(S) : Florent Strahm et al.

Page 1 of 1

It is certified that error appears in the above-identified patent and that said Letters Patent is hereby corrected as shown below:

In the Specification

Please replace the following paragraph in Column 1; beginning on Line 8 through Line 14 from:
"This is a National Phase Application in the United States of International Patent Application PCT/EP2014/055984 filed Mar. 25, 2014, which claims priority on European Patent Applications No. 13161768.0 of Mar. 28, 2013 and Ser. No. 13/163777.9 of Apr. 15, 2013 The entire disclosures of the above patent applications are hereby incorporated by reference."

To:
-- This is a National Phase Application in the United States of International Patent Application PCT/EP2014/055984 filed Mar. 25, 2014, which claims priority on European Patent Applications No. 13161768.0 of Mar. 28, 2013 and 13163777.9 of Apr. 15, 2013. The entire disclosures of the above patent applications are hereby incorporated by reference. --

Signed and Sealed this
Sixteenth Day of April, 2019

Andrei Iancu
*Director of the United States Patent and Trademark Office*